Figure 1:
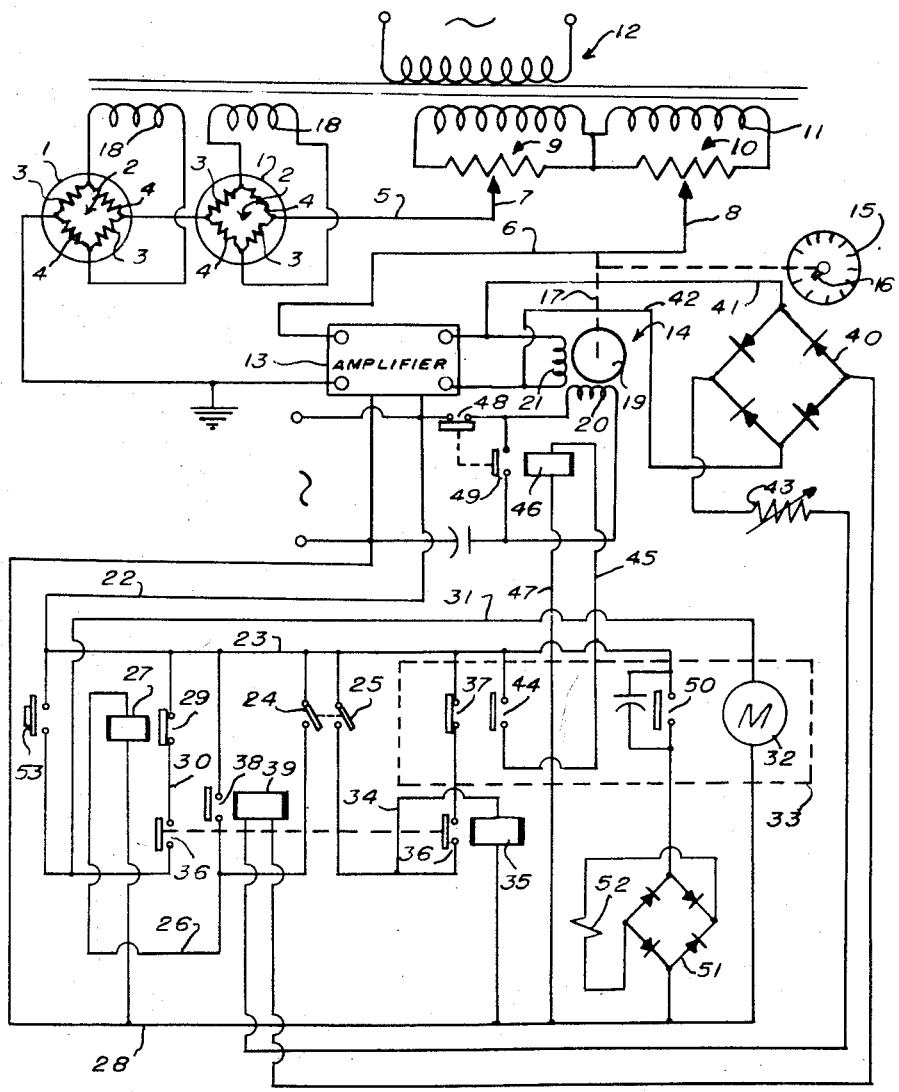

Dec. 29, 1959    C. F. SPADEMAN    2,919,123
WEIGHING SCALE

Filed Jan. 3, 1957    2 Sheets-Sheet 1

INVENTOR.
CHARLES F. SPADEMAN
BY
Marshall, Marshall & Yeasting
ATTORNEYS

Dec. 29, 1959
C. F. SPADEMAN
2,919,123
WEIGHING SCALE
Filed Jan. 3, 1957
2 Sheets-Sheet 2
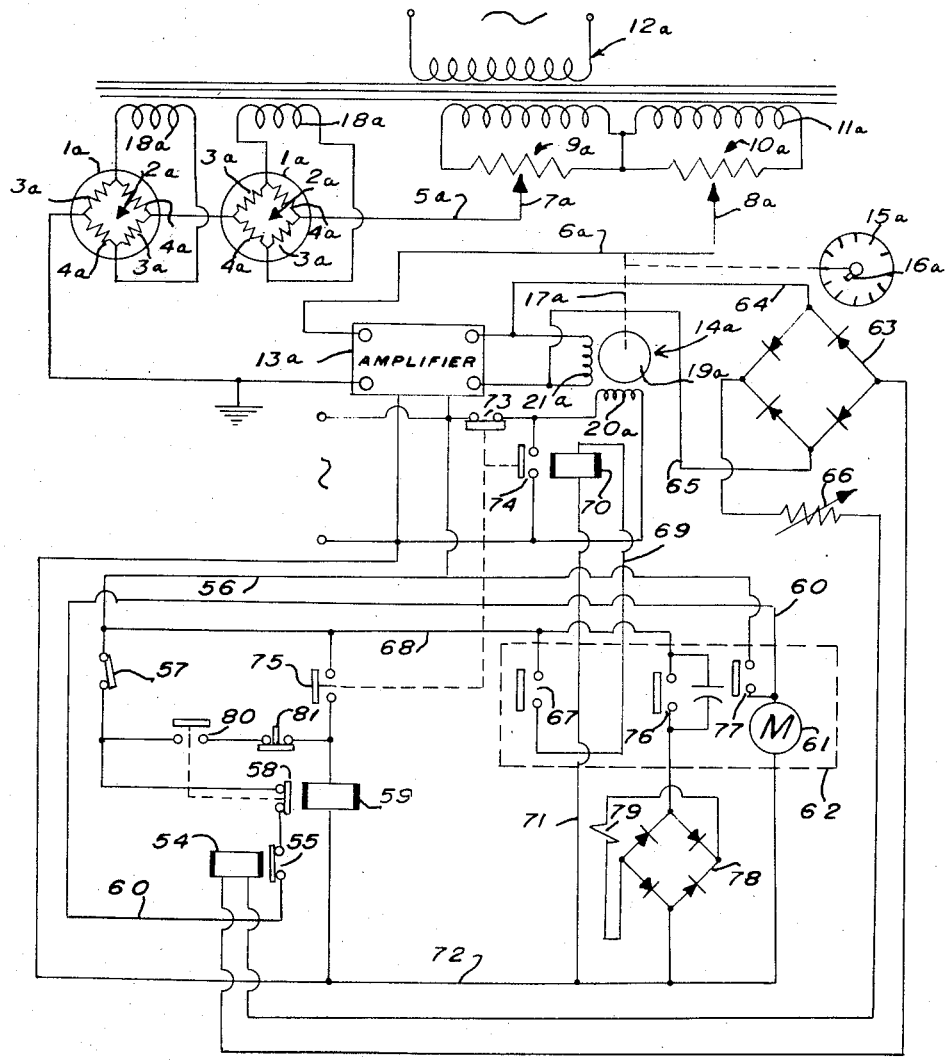
Fig. II
INVENTOR.
CHARLES F. SPADEMAN
BY
Marshall, Marshall & Easting
ATTORNEYS United States Patent Office 2,919,123
Patented Dec. 29, 1959

2,919,123

WEIGHING SCALE

Charles F. Spademan, Toledo, Ohio, assignor, by mesne assignments, to Toledo Scale Corporation, Toledo, Ohio, a corporation of Ohio Application January 3, 1957, Serial No. 632,353

14 Claims. (Cl. 265—5)

This invention relates to automatic weighing scales and in particular to electrical control circuits for such scales.

The control circuits are especially suitable for use with a load cell weighing scale of the electronic type which includes a balanceable network having an output voltage which is a function of load applied to the weighing scale and a continuously automatically adjustable voltage source that supplies a second voltage in opposition to the output voltage of the network and that operates in response to differences between the voltages.

The principal object of this invention is to provide a weighing scale having means controlled by an automatic, no premature print electrical circuit for printing the weight of a load upon the scale.

Other objects and advantages will be apparent from the following description of several preferred forms of the invention.

According to the invention, an automatic, no premature print circuit is provided for a weighing scale which may comprise a load cell, a balanceable network that includes an electrical strain gage operatively connected to the load cell and that is adapted to be unbalanced in response to changes in load applied to the load cell, and a circuit that is connected to the network and that includes a potentiometer having a constant resistance and a sliding contact and a servomotor for automatically varying the position of the sliding contact relative to the constant resistance to vary the output voltage of the circuit in accordance with the output voltage of the network, the output voltage of the network being in opposition to the output voltage of the circuit. The weighing scale also includes printing mechanism comprising an indicia-bearing disk which is positioned by the servomotor for indicating the output voltage of the network in terms of weight and a switch-operating member which also is positioned by the servomotor.

The print circuit, which functions automatically to control the operation of the printing mechanism, includes a contact which is controlled by a null detector relay for completing the print circuit to make a print when the relay senses a null or balance condition, a limit switch which is operated by the switch-operating member for preventing printing when no load is upon the weighing scale, and a memory relay that "remembers" when one print has been made for breaking the print circuit after one print has been made to prevent repeat printing before returning to zero. An additional relay may be included in the print circuit and functions to paralyze the servomotor before the printing starts, thus, preventing repositioning of the indicia-bearing disk by the servomotor while the printing takes place.

Preferred embodiments of the invention are illustrated in the accompany drawings.

In the drawings:

Figure I is a schematic wiring diagram showing the essential components of an electronic weighing scale embodying the invention.

Figure II is a schematic wiring diagram showing the essential components of the electronic weighing scale embodying a second species of the invention.

These specific figures and the accompanying description are intended merely to illustrate the invention and not to impose limitations on the claims.

Referring to Figure I, the electronic weighing scale includes a pair of load receivers or load cells 1 connected in series and each comprising a resistance wire strain gage bridge 2. Each of the bridges 2 has resistance elements 3 in two of its legs and resistance elements 4 in the other two legs. The bridges 2 are of an ordinary type used in gages available for measuring strain wherein the elements 3 and 4 are adapted to change in resistance with changes in a condition to be measured, e.g., load applied to the load cells 1. It is to be appreciated, however, that other forms of electrical translators which produce electrical signals that are functions of the loads applied to the load cells 1 may be used in place of the strain gage bridges 2.

In order that the point from which the measurements are made may be adjusted and that measurements of the values from such point may be obtained, there are provided conductors 5 and 6 from the output terminals of the series-connected bridges 2 to sliding contacts 7 and 8 of potentiometers 9 and 10, respectively, connected together and energized from secondary windings 11 of a transformer 12. An amplifier and motor control device 13 is connected in circuit with the conductor 6 and controls the operation of a servomotor 14 which turns or positions an indicia-bearing disk 15, a switch-operating member 16, which turns as one with the disk 15, and the sliding contact 8 through a belt drive 17 which is indicated by broken lines. The disk 15 is a printing type bearing member and functions to indicate the output voltage of the bridge network in terms of weight and also serves as a type disk which is used to print indications of weight as shown in detail in U.S. Patent No. 2,483,989 entitled "Printing Scale" which was issued to L. S. Williams on October 4, 1949. The printing mechanism, not a part of the present invention, which is shown in such patent employs a movable jaw or platen that serves to pinch the disk against an inked ribbon and recording paper. The sliding contact 7 is adapted to be positioned manually. Secondary windings 18 of the transformer 12 are connected to the bridges 2 for energizing the latter.

The servomotor 14 is shown as a reversible, two-phase motor having a rotor 19 connected to the sliding contact 8, to the disk 15, and to the switch-operator 16 to position them. The servomotor 14 includes a reference or power winding 20 connected to a suitable source of alternating current and a control winding 21. By changing the phase of the voltage supplied to the control winding 21 with respect to the phase of the reference voltage in the reference winding 20, the direction of the servomotor 14 will be reversed as is understood in the art.

The series-connected bridges 2 form a balanceable network that is adapted to be unbalanced in response to changes in load applied to the load cells 1, i.e., the network develops an output voltage between the conductors 5 and 6 which is a function of load applied to the load cells. This output voltage opposes the output voltage of the potentiometers 9 and 10, the potentiometer 10 driven by the servomotor 14 serving as a continuously automatically adjustable voltage source or alterable signal source. The output voltage of the bridge network opposes the output voltage of the potentiometer circuit connected thereto to determine the flow of current through the amplifier and motor control device 13. An unbalance of the output voltages results in operation of the servomotor 14 to turn the disk 15 through a distance proportional to the load placed upon the load cells and the contact 8 until the opposing voltages are equal, whereby input voltage to the amplifier 13 is restored to null. An adjustment of contact 7 results in a change in the positions of contact 8 to produce a balance for predetermined conditions to be measured. The positions of contact 8 are representative of the conditions measured, and a changing of these positions by manual adjustment of contact 7 merely results in an indication of the values from a different zero point.

A no premature print circuit is tied into the networks hereinbefore described and functions automatically to control the operation of the printing mechanism. The print circuit is connected to the same source of alternating current as is the reference winding 20 of the servomotor 14. When no load is upon the weighing scale, current flows from said source through a conductor 22, a branch conductor 23 and normally open limit switches 24 and 25 which are tied together to move as one and which are so operated by the switch-operating member 16 that they automatically are closed at zero indication of the indicia-bearing disk 15. The current flowing through the limit swich 24 flows through a conductor 26 to energize the coil of a relay 27 which is connected to a conductor 28 that serves as a return to the other side of the line. Energization of the relay 27 causes it to open its normally closed contact 29 to prevent current from flowing from the branch conductor 23 through a conductor 30 and then through a conductor 31 to energize a timer motor 32 of a timer 33. The current flowing through the limit switch 25 flows through a conductor 34 to energize the coil of a memory relay 35 which also is connected to the return conductor 28. Energization of the memory relay 35 causes it to close its two normally open contacts 36. Hence, when no load is upon the weighing scale, the limit switches 24 and 25 are closed and both of the relays 27 and 35 are energized.

When a load is placed upon the weighing scale, the switch-operating member 16 moves away from the normally open limit switches 24 and 25 which thereupon open. Opening of the limit switches 24 and 25, the closing of which caused the initial energization of the relays 27 and 35, however, does not cause deenergization of either one of the relays. The memory relay 35 is held energized (self-holding) by current flowing from the branch conductor 23 through a timer contact 37 of the timer 33, closed memory relay contact 36 and conductor 34. Relay 27 is held energized by current flowing from the branch conductor 23 through a now closed but normally open contact 38 of a sensitive null detecting relay 39 to the conductor 26. The null detecting relay 39 is connected across a full wave rectifier 40 which is connected in turn to the amplifier and motor control device 13 by means of conductors 41 and 42. Output voltage from the amplifier 13 above a predetermined fixed value, as adjusted by a variable resistor or voltage regulator 43, causes the coil of the sensitive relay to be energized which closes contact 38. However, when the signal drops below such fixed value or amplitude the null detecting relay 39 becomes deenergized and its normally open contact 38 opens. The fixed value is set in the present instance at zero so that the coil of the sensitive relay 39 becomes deenergized at the null, i.e., when the output voltage of the bridge network and the output voltage of the potentiometer circuit are balanced.

When the coil of the sensitive relay 39 becomes deenergized at the null and its contact 38 opens, the flow of current through conductor 26 to relay 27 is cut off and the relay becomes deenergized. This permits normally closed contact 29 to close and current flows from the branch conductor 23 through closed contacts 29 and 36 and conductor 31 to energize the timer motor 32. The timer motor 32, thus, cannot be energized until contact 29, which is controlled indirectly by the null detecting relay 39, closes to complete the print circuit.

The timer motor 32 first closes timer contact 44 and current flows from the branch conductor 23 through closed contact 44 and a conductor 45 to energize the coil of a relay 46 and through a conductor 47 to the return conductor 28. Energization of the relay 46 first causes its normally closed contact 48 to open to break the circuit to the reference winding 20 of the servomotor 14 and then its normally open contact 49 to close which shorts out and paralyzes the servomotor 14 thus preventing repositioning of the disk 15 coupled to the servomotor as a result of timing motor transients while printing takes place. This prevents an erroneous weight printing. Such transients may be caused by inductive coupling between conductors associated with the timer motor and with the servomotor that may be carried in a common cable or by signal coupling should a heavy load suddenly change the excitation to the amplifier and motor control device 13. It is to be appreciated that contacts 48 and 49 alternatively may be in circuit with the control winding 21 to paralyze the servomotor during printing.

The timer motor 32 then closes timer contact 50 and current flows to a full wave rectifier 51 and to the other side of the line. Direct current from the rectifier 51 energizes a print solenoid 52, the structure and function of which is shown and described in detail in the hereinbefore mentioned U.S. Patent No. 2,483,989, which causes the disk 15 to be pinched against the inked ribbon and recording paper.

After the printing is completed, timer contact 50 opens deenergizing the print solenoid 52, timer contact 44 also opens dropping out the relay 46 so that the normally closed relay contact 48 closes and the normally open relay contact 49 opens, and timer contact 37 also opens dropping out the memory relay 35 so that its contacts 36 open. The timer contact 37 then is closed in preparation for the next printing cycle. Opening of that one of the contacts 36 in circuit with the conductor 31 prevents current flow to the timer motor 32. The memory relay 35 "remembers" that one print has been made and functions to prevent repeat printing before the scale returns to zero. This is necessary because every time part of the load is removed from the scale the null detecting relay 39 senses a new balance condition and calls for another print to be made. When all of the load is removed from the scale, the null detecting relay 39 again senses a balance condition after the scale comes to rest, however, the closing of the limit switches 24 and 25 by the switch-operating member 16 at zero indication causes the relays 27 and 35 to be energized again causing relay contact 29 to open keeping the circuit to the timer motor 32 open to prevent printing when no load is upon the scale and to cause relay contacts 36 to close causing the memory relay to be self-holding in preparation for the next printing cycle.

The relay contact 29 is controlled indirectly by the null detector 39 and functions to complete the print circuit to make a print automatically when the scale comes to rest; the memory relay 35 breaks the print circuit after one print has been made to prevent repeat printing before returning to zero; and the limit switch 24 prevents printing when no load is upon the weighing scale. Repeat prints can be made before returning to zero by depressing a print button 53 which is in circuit with the conductor 31.

In operation, a load placed upon the load cells 1 causes the series-connected bridges 2 to become unbalanced resulting in operation of the servomotor 14 to turn the indicia-bearing disk 15 through a distance which is proportional to such load, to move the switch-operating member 16 away from the limit switches 24 and 25, and to position the potentiometer contact 8 until the opposing voltage from the potentiometer circuit balances the output voltage from the bridge network. At the null or balance position, the output voltage from the bridge network is indicated by the position of the disk 15 in terms of weight. Unbalance of the voltages is sensed by the null detecting relay 39 which closes its contact 38 as soon as the load is placed upon the load cells 1 to prevent premature printing. During the weighing cycle while the scale is moving no print can be made.

At the balance position, the null detecting relay 39 becomes deenergized, contact 38 opens, and contact 29 closes automatically completing the print circuit to the timer motor 32 to obtain a printed record of the weight of the load upon the scale. Before the print is made, the servomotor 14 is paralyzed to prevent movement of the disk 15 while the printing takes place. The memory relay 35 is released after one print has been made to prevent repeat printing before returning to zero. After the scale returns to zero, the limit switch 24 is closed to prevent printing when no load is upon the scale at which point the null detecting relay 39 also senses a balance condition.

A modification of the no premature print circuit is illustrated in Figure II. Similar reference numerals in Figures I and II identify elements which are alike in structure and in function. The modified print circuit is connected to the same source of alternating current as is the reference winding 20a of the servomotor 14a and functions automatically to control the operation of the printing mechanism.

With load upon the scale at the balance position, a sensitive null detecting relay 54 becomes deenergized and its normally closed contact 55 in the print circuit closes and current flows from a conductor 56 through a normally closed limit switch 57, normally closed relay contact 58 of a memory relay 59, contact 55 and a conductor 60 to energize a timer motor 61 of a timer 62.

The null detecting relay 54 is connected across a full wave rectifier 63 which is connected in turn to the amplifier and motor control device 13a by means of conductors 64 and 65. Output voltage from the amplifier 13a above a predetermined fixed value, as adjusted by a variable resistor or voltage regulator 66, causes the coil of the sensitive relay to be energized to open its contact 55. However, when the signal drops below such fixed value or amplitude, the null detecting relay 54 becomes deenergized and its normally closed contact 55 closes. The fixed value is set in the present instance at zero so that the coil of the sensitive relay 54 becomes deenergized at the null, i.e., when the output voltage of the bridge network and the output voltage of the potentiometer circuit are balanced.

The energized timer motor 61 first closes timer contact 67 and current flows from a branch conductor 68 through the closed contact 67 and a conductor 69 to energize the coil of a relay 70 and through a conductor 71 to a return conductor 72. Energization of the relay 70 first causes its normally closed contact 73 to open to break the circuit to the reference winding 20a of the servomotor 14a and then its normally open contact 74 to close which shorts out and paralyzes the servomotor 14a thus preventing repositioning of the disk 15a coupled to the servomotor as a result of timing motor transients while printing takes place. This prevents an erroneous weight printing. Such transients may be caused by inductive coupling between conductors associated with the timer motor and with the servomotor that may be carried in a common cable or by signal coupling should a heavy load suddenly change the excitation to the amplifier and motor control device 13a. Energization of the relay 70 also causes its normally open contact 75 to close. Current then flows from the branch conductor 68 through the closed contact 75 to energize the coil of the memory relay 59 which is connected to the return conductor 72.

At about the same time as relay contact 75 closes, the timer motor 61 closes timer contacts 76 and 77 and current flows through closed contact 76 to a full wave rectifier 78 and to the other side of the line. Direct current from the rectifier 78 energizes a print solenoid 79, the structure and function of which is shown and described in detail in the hereinbefore mentioned U.S. Patent No. 2,483,989, which causes the disk 15a to be pinched against the inked ribbon and recording paper.

Energization of the memory relay 59 causes it to open its normally closed contact 58 and to close its normally open contact 80. Closing of contact 80 permits current to flow through the closed limit switch 57, contact 80, and a print button 81, which functions as a means for making repeat prints before returning to zero, to the coil of the memory relay 59 making the relay self-holding and independent of current flow through the relay contact 75. The memory relay 59 "remembers" that one print has been made and functions to prevent repeat printing before the scale returns to zero by said opening of its contact 58 which serves to break the circuit through the conductor 60 to the timer motor 61. This is necessary because every time part of the load is removed from the scale and the scale comes to rest the null detecting relay 54 senses a new balance condition and calls for another print to be made. Even though the circuit through the conductor 60 is broken, the timer motor 61 nevertheless continues to be energized by current flowing from the conductor 56 through the closed timer contact 77.

After the printing is completed, timer contact 76 opens deenergizing the print solenoid 79, timer contact 67 also opens dropping out the relay 70 so that the normally open relay contacts 74 and 75 open and the normally closed relay contact 73 closes, and timer contact 77 also opens cutting off the flow of current to the timer motor 61. At this time all of the timer contacts 67, 76 and 77 are open as indicated in Figure II and the timer motor 61 is deenergized, the motor being ready for the next printing cycle to be initiated.

When all of the load is removed from the scale and the scale comes to rest, the null detecting relay 54 again senses a balance condition and its contact 55 closes, however, the limit switch 57 is opened at zero weight indication by the switch-operating member 16a keeping the circuit through the conductor 60 to the timer motor 61 open preventing printing when no load is upon the scale. Opening of the limit switch 57 breaks the flow of current through the switch 57, memory relay contact 80, and print button 81 to the coil of the memory relay 59 which becomes deenergized. Deenergization of the memory relay 59 causes its contact 58 to close and its contact 80 to open. The circuit through conductor 60 to the timer motor 61 is then again completed except for the break at the limit switch 57 which is held open at zero indication by the switch-operating member 16a.

The contact 55 is controlled by the null detecting relay 54 automatically to complete the print circuit to make a print when the relay senses a condition of balance; the limit switch 57 which is operated by the switch-operating member 16a functions to prevent printing when no load is upon the weighing scale; and the memory relay 59 functions to break the print circuit after one print has been made to prevent repeat printing before returning to zero, such repeat printing being possible, however, by depression of the manually operated print button 81.

In operation, a load placed upon the load cells 1a causes the series-connected bridges 2a to become unbalanced resulting in operation of the servomotor 14a to turn the indicia-bearing disk 15a through a distance which is proportional to such load, to move the switch-operating member 16a away from the limit switch 57 which then closes, and to position the potentiometer contact 8a until the opposing voltage from the potentiometer circuit balances the output voltage from the bridge network. At the null or balance position, the output voltage from the bridge network is indicated by the position of the disk 15a in terms of weight. Unbalance of the voltages is sensed by the null detecting relay 54 which opens its contact 55 as soon as the load is placed upon the load cells 1a to prevent premature printing. During the weighing cycle while the scale is moving no print can be made.

At the balance position, the null detecting relay 54 becomes deenergized and its contact 55 closes automatically completing the print circuit to the timer motor 61 to obtain a printed record of the weight of the load upon the scale. Before the print is made, the servomotor 14a is paralyzed to prevent movement of the disk 15a while the printing takes place. The memory relay 59 is energized after one print has been made to open its contact 58 to prevent repeat printing before returning to zero. After the scale returns to zero, the limit switch 57 is opened to prevent printing when no load is upon the scale at which point the null detecting relay 54 also senses a balance condition.

The embodiments of the invention herein shown and described are to be regarded as illustrative only, and it is to be understood that the invention is susceptible to variation, modification, and change within the spirit and scope of the subjoined claims.

Having described the invention, I claim:

1. A weighing scale comprising, in combination, a balanceable network having an output voltage which is a function of load applied to the weighing scale, an amplifier and motor control device connected to the network, a continuously automatically adjustable voltage source that is connected to the amplifier and motor control device and that supplies a second voltage in opposition to the output voltage of the network and that operates in response to differences between the voltages, printing mechanism coupled to the source, a switch-operating member also coupled to the source, a null detector that is connected to the amplifier and motor control device and that senses balances between the voltages, and a print circuit for automatically controlling the operation of the printing mechanism, the print circuit including a contact which is controlled by the null detector for completing the circuit to make a print when the voltages are balanced, a limit switch operated by the switch-operating member for preventing printing when no load is upon the weighing scale and a memory relay for breaking the circuit after one print has been made to prevent repeat printing before returning to zero.

2. A weighing scale according to claim 1 wherein the print circuit includes means for preventing repositioning of the printing mechanism while printing takes place.

3. A weighing scale comprising, in combination, a load cell, a balanceable network that includes an electrical strain gauge operatively connected to the load cell and that is adapted to be unbalanced in response to changes in load applied to the load cell, an amplifier and motor control device connected in the balanceable network, a second network that is connected to the amplifier and motor control device and that includes a potentiometer having a constant resistance and a sliding contact, a servomotor that is controlled by the amplifier and motor control device for automatically varying the position of the sliding contact relative to the constant resistance to vary the output voltage of the second network in accordance with the output voltage of the balanceable network, the output voltages being in opposition to each other, printing mechanism coupled to the servomotor, a switch-operating member also coupled to the servomotor, a null detector that is connected to the amplifier and motor control device and that senses balances between the voltages, and a print circuit for automatically controlling the operation of the printing mechanism, the print circuit including a contact which is controlled by the null detector for completing the circuit to make a print when the voltages are balanced, a limit switch operated by the switch-operating member for preventing printing when no load is upon the load cell and a memory relay for breaking the circuit after one print has been made to prevent repeat printing before returning to zero.

4. A weighing scale according to claim 3 wherein the print circuit includes means for paralyzing the servomotor while printing takes place.

5. A weighing scale according to claim 4 wherein the means for paralyzing the servomotor comprises a relay which causes a circuit to the servomotor to be broken and the servomotor to be shorted out thus preventing repositioning of the printing mechanism by the servomotor while printing takes place.

6. A weighing scale comprising, in combination, a load cell, means for generating an output potential proportional to the weight of a load applied to the load cell, an alterable signal source that supplies a signal in opposition to the output potential, servo means responsive to differences between the output potential and the signal for altering the signal to a level balancing the output potential, printing mechanism coupled to the servo means, a switch-operator also coupled to the servo means, a null detector which senses balances between the output potential and the signal, and a print circuit for automatically controlling the operation of the printing mechanism, the print circuit including a contact which is controlled by the null detector for completing the circuit to make a print when the output potential and the signal are balanced, a limit switch operated by the switch-operator for preventing printing when no load is upon the load cell and a memory relay for breaking the circuit after one print has been made to prevent repeat printing before returning to zero.

7. A weighing scale according to claim 6 wherein the print circuit includes means for paralyzing the servo means while printing takes place.

8. A weighing scale according to claim 7 wherein the means for paralyzing the servo means comprises a relay which causes a circuit to the servo means to be broken and the servo means to be shorted out thus preventing repositioning of the printing mechanism by the servo means while printing takes place.

9. A weighing scale comprising, in combination, a load receiver, an electrical translating element coupled to the load receiver and having an output potential magnitude which is a function of a load applied to the load receiver, a continuously automatically adjustable voltage source that supplies a voltage in opposition to the output potential of the electrical translating element and that operates in response to differences between the output potential of the translating element and the voltage of the source, printing means coupled to the source, a switch-operating member also coupled to the source, a null detector for sensing balances between the output potential and the voltage, and a print circuit for automatically controlling the operation of the printing means, the print circuit including a contact which is controlled by the null detector for completing the circuit to make a print when the output potential and the voltage are balanced, a limit switch operated by the switch-operating member for preventing printing when no load is upon the load receiver and a memory relay for breaking the circuit after one print has been made to prevent repeat printing before returning zero.

10. A weighing scale according to claim 9 wherein the print circuit includes means for preventing repositioning of the printing means while printing takes place.

11. A weighing scale comprising, in combination, a balanceable network having an output voltage which is a function of load applied to the weighing scale, an amplifier and motor control device connected in the network, a continuously automatically adjustable voltage source that is connected to the amplifier and motor control device and that supplies a second voltage in opposition to the output voltage of the network and that operates in response to differences between the voltages, printing mechanism and coupled to the source, a switch-operating member also coupled to the source, a null detector that is connected to the amplifier and motor control device and that senses balances between the voltages, and a print circuit for automatically controlling the operation of the printing mechanism, the print circuit including a contact which is controlled by the null detector for completing the circuit to make a print when the voltages are balanced, a first limit switch operated by the switch-operating member for preventing printing when no load is upon the weighing scale, a memory relay for breaking the circuit after one print has been made to prevent repeat printing before returning to zero and a second limit switch also operated by the switch-operating member which, when no load is upon the weighing scale, together with the memory relay prepares the circuit for printing at any instant.

12. A weighing scale comprising, in combination, a load cell, a balanceable network that includes an electrical strain gauge operatively connected to the load cell and that is adapted to be unbalanced in response to changes in load applied to the load cell, an amplifier and motor control device connected in the balanceable network, a second network that is connected to the amplifier and motor control device and that includes a potentiometer having a constant resistance and a sliding contact, a servomotor that is controlled by the amplifier and motor control device for automatically varying the position of the sliding contact relative to the constant resistance to vary the output voltage of the second network in accordance with the output voltage of the balanceable network, the output voltages being in opposition to each other, printing mechanism coupled to the servomotor, a switch-operating member also coupled to the servomotor, a null detector that is connected to the amplifier and motor control device and that senses balances between the voltages, and a print circuit for automatically controlling the operation of the printing mechanism, the print circuit including a contact which is controlled by the null detector for completing the circuit to make a print when the voltages are balanced, a first limit switch operated by the switch-operating member for preventing printing when no load is upon the weighing scale, a memory relay for breaking the circuit after one print has been made to prevent repeat printing before returning to zero and a second limit switch also operated by the switch-operating member which, when no load is upon the weighing scale, together with the memory relay prepares the circuit for printing at any instant.

13. A weighing scale comprising, in combination, a load cell, means for generating an output potential proportional to the weight of a load applied to the load cell, an alterable signal source that supplies a signal in opposition to the output potential, servo means responsive to differences between the output potential and the signal for altering the signal to a level balancing the output potential, printing mechanism coupled to the servo means, a switch-operator also coupled to the servo means, a null detector which senses balances between the output potential and the signal, and a print circuit for automatically controlling the operation of the printing mechanism, the print circuit including a contact which is controlled by the null detector for completing the circuit to make a print when the output potential and the signal are balanced, a first limit switch operated by the switch-operator for preventing printing when no load is upon the weighing scale, a memory relay for breaking the circuit after one print has been made to prevent repeat printing before returning to zero and a second limit switch also operated by the switch-operator which, when no load is upon the weighing scale, together with the memory relay prepares the circuit for printing at any instant.

14. A weighing scale comprising, in combination, a load receiver, an electrical translating element coupled to the load receiver and having an output potential magnitude which is a function of a load applied to the load receiver, a continuously automatically adjustable voltage source that supplies a voltage in opposition to the output potential of the electrical translating element and that operates in response to differences between the output potential of the translating element and the voltage of the source, printing means coupled to the source, a switch-operating member also coupled to the source, a null detector for sensing balances between the output potential and the voltage, and a print circuit for automatically controlling the operation of the printing means, the print circuit including a contact which is controlled by the null detector for completing the circuit to make a print when the output potential and the voltage are balanced, a first limit switch operated by the switch-operating member for preventing printing when no load is upon the weighing scale, a memory relay for breaking the circuit after one print has been made to prevent repeat printing before returning to zero and a second limit switch also operated by the switch-operating member which, when no load is upon the weighing scale, together with the memory relay prepares the circuit for printing at any instant.

References Cited in the file of this patent

UNITED STATES PATENTS 2,346,117    Stabler _____ Apr. 4, 1944